(12) United States Patent
Liu et al.

(10) Patent No.: US 9,129,627 B1
(45) Date of Patent: Sep. 8, 2015

(54) SECTOR-BASED WRITE OPERATION

(71) Applicant: Seagate Technology LLC, Cupertino, CA (US)

(72) Inventors: Xiong Liu, Singapore (SG); Wen Xiang Xie, Singapore (SG); Than Zaw Thein, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/278,886

(22) Filed: May 15, 2014

(51) Int. Cl.
 G11B 5/09 (2006.01)
 G11B 5/55 (2006.01)

(52) U.S. Cl.
 CPC .................................. *G11B 5/5526* (2013.01)

(58) Field of Classification Search
 None
 See application file for complete search history.

(56) References Cited

U.S. PATENT DOCUMENTS

| | | | | |
|---|---|---|---|---|
| 5,142,515 A * | 8/1992 | McFerrin et al. | | 369/30.11 |
| 5,519,681 A * | 5/1996 | Maeda et al. | | 369/47.16 |
| 5,907,655 A * | 5/1999 | Oguro | | 386/245 |
| 7,181,298 B1 | 2/2007 | Yoshio et al. | | |
| 8,559,121 B2 | 10/2013 | Saito et al. | | |
| 8,625,215 B1 * | 1/2014 | Burd et al. | | 360/31 |
| 8,699,162 B1 * | 4/2014 | Grobis et al. | | 360/48 |
| 2002/0054444 A1 * | 5/2002 | Lee | | 360/55 |
| 2002/0054555 A1 * | 5/2002 | Karakawa et al. | | 369/53.33 |
| 2002/0166090 A1 * | 11/2002 | Maeda et al. | | 714/746 |
| 2003/0214743 A1 * | 11/2003 | Urata | | 360/53 |
| 2004/0190188 A1 * | 9/2004 | Zaitsu | | 360/77.02 |
| 2006/0232874 A1 * | 10/2006 | Tsuchinaga et al. | | 360/75 |
| 2007/0174582 A1 * | 7/2007 | Feldman | | 711/202 |
| 2008/0144210 A1 * | 6/2008 | Dougherty et al. | | 360/77.02 |
| 2008/0304172 A1 | 12/2008 | Bi et al. | | |
| 2012/0300333 A1 * | 11/2012 | Tinker | | 360/55 |
| 2012/0300341 A1 * | 11/2012 | Matsuo et al. | | 360/77.02 |
| 2013/0031306 A1 * | 1/2013 | Kim | | 711/113 |
| 2013/0031406 A1 * | 1/2013 | Cho | | 714/6.1 |
| 2013/0038960 A1 * | 2/2013 | Song | | 360/49 |
| 2013/0238834 A1 | 9/2013 | Feldman et al. | | |
| 2014/0254042 A1 * | 9/2014 | Yeo et al. | | 360/48 |

OTHER PUBLICATIONS

Feldman, et al., "Shingled Magnetic Recording; Areal Density Increase Requires New Data Management," Usenix, Jun. 2013, vol. 38, No. 3, www.usenix.org.

* cited by examiner

Primary Examiner — Peter Vincent Agustin
(74) Attorney, Agent, or Firm — HolzerIPLaw, PC

(57) ABSTRACT

A method or system comprises determining a target sector of a write operation in response to a request for the write operation to a band in a storage device, determining a plurality of down-track data sectors in the band, and performing a band rewrite operation on the target data sector and the down-track data sectors.

15 Claims, 7 Drawing Sheets

SECTOR-BASED WRITE OPERATION

BACKGROUND

As the requirements for data storage, retrieval, and analysis have increased, the need for cheaper and larger data storage devices has also increased. Data storage devices, such as disc drives, magnetic tapes, etc., store data on a different recording media using different storage technologies such as magnetic recording, optical recording, etc. Disc drives are widely used as data storage device in computing systems. To meet the increasing needs, disc drives providers have increased the capacity of the disc drives as well as the density of recording on the disc drives. At the same time, given the vast amount of data being stored and processed by users, storage device providers are under pressure to provide storage capacity at cheaper cost.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

In one implementation of this disclosure, a method is provided that includes determining a target sector of a write operation in response to a request for the write operation to a band in a storage device, determining a plurality of down-track data sectors in the band, and performing a band rewrite operation on the target data sector and the down-track data sectors.

These and various other features and advantages will be apparent from a reading of the following Detailed Description.

BRIEF DESCRIPTION OF THE DRAWING

A further understanding of the various implementations described herein may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Figure 1:
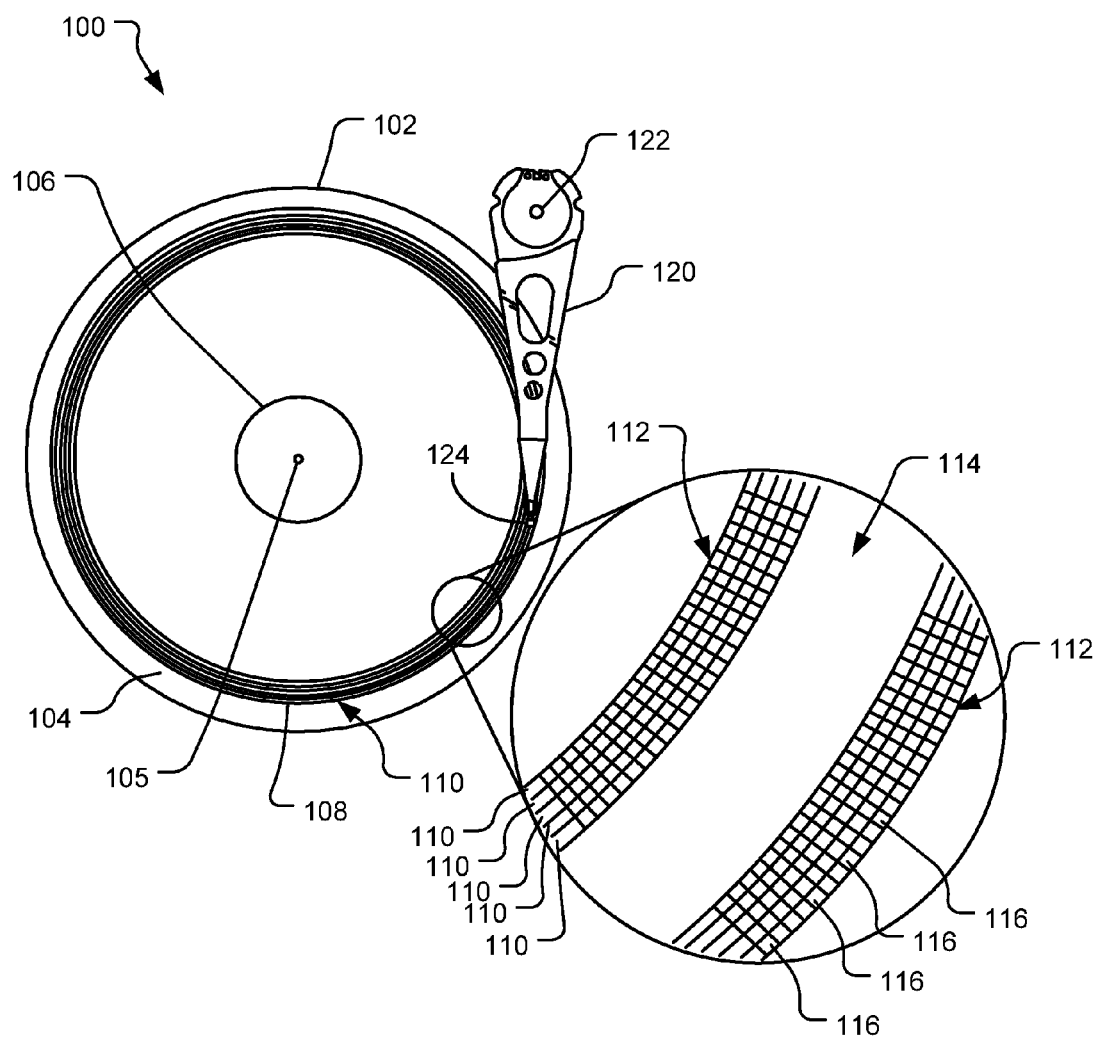
FIG. 1 is a top view of an example data storage system, particularly a disc drive.

In the following description, for the purposes of explanation, numerous specific details are set forth in order to provide a thorough understanding of the various implementations described herein. While various features are ascribed to particular implementations, it should be appreciated that the features described with respect to one implementation may be incorporated with other implementations as well. By the same token, however, no single feature or features of any described implementation should be considered essential, as other implementations may omit such features.

Magnetic media storage drives store data in polarized cells on one or more magnetized media within each storage drive. A magnetic disc drive is one implementation of a magnetic media storage drive in which the magnetic medium is a disc and the polarized cells are arranged on the disc in concentric, generally circular tracks. In operation, one or more of the discs rotate at a constant speed within the storage drive while information is written to and read from the tracks on the disc(s) using an actuator assembly. The actuator assembly includes one or more actuator arms that extend towards the discs. Mounted at the distal end of each of the actuator arms is a transducer head with a read pole and a write pole. The write pole generates a magnetic field adapted to change the magnetic polarization of the cells on a corresponding disc (i.e., it writes data to the disc) and the read pole detects the magnetic polarization of the cells on the corresponding disc (i.e., it reads data from the disc).

In a non-shingled magnetic medium, each of the cells on the magnetized medium is of a sufficiently large size relative to the size of the write pole to allow the write pole to write data to the cells without overwriting data in any surrounding cells. As a result, data may be randomly written to available cells anywhere on the magnetic medium. However, as requirements for data storage density increase for the magnetic media, cell size decreases. A commensurate decrease in the size of the write pole is difficult because a strong write field gradient provided by a larger write pole is often required to shift the polarity of the cells on the magnetized medium. As a result, writing data to smaller cells on the magnetized medium using the relatively larger write pole may affect the polarization of adjacent cell(s) (i.e., overwrite the adjacent cell(s)). One technique for adapting the magnetic media to utilize smaller cells while preventing adjacent cells from being overwritten during a write operation is shingled magnetic recording (SMR).

Shingled magnetic recording utilizes a large strong write field generated by the write pole. One constraint of shingled magnetic recording is that when the data is written to the magnetic media, it is written in sequentially increasing or decreasing radius tracks. The strong write field overlaps a currently written track with a previously written track, leaving a relatively small strip of the previous write track unaffected, and also overlaps that currently written track with one or more not-yet-written tracks. The remaining strip of written data on the previously written track contains the aforementioned cells that, while merely a fraction of the feasible write size, are sufficiently large to be read using the read pole. As a result, while shingled magnetic recording still allows for traditional random access read operations, writes can no longer be done randomly because a single-track write modifies/overwrites the one or more not-yet-written (or yet-to-be written) tracks. As a result, in order to change any data cell within the shingled data, the entire shingled data is re-written in the selected sequential write order.

For example, in a disc drive using SMR, tracks on a disc are grouped together as a band and writing data to one track of the band may erase the data on the next adjacent track of that band. As a result, writing any data to a band requires writing data to the entire band. Thus, even if the amount of data to be written to a part of a band is small, the entire band has to be re-written to ensure that no data is lost during the write operation. As a result, write operations to parts of a band on a SMR disc drive take more time than on a non-SMR disc drive. Such loss of time is specifically large in cases of SMR disc drives with bigger band size, such as, for example, 100 tracks/band. However, using bigger band size is useful in achieving more area density.

An implementation disclosed herein provides for efficient write operations on SMR bands to reduce the time taken for the write or rewrite operation. Specifically, a method disclosed herein includes determining the data sector(s) to be rewritten or modified in a band, determining the corresponding sector(s) in downstream or down-track tracks of that band, and rewriting only those down-track sectors; the method entails rewriting only sector(s) of the track, rather than the entire track, thus saving writing time and power. For example, if a band has 100 tracks, $trk_0$ to $trk_{99}$, each with about 300 sectors, $s_0$ to $s_{299}$ or so, and a write command specifies writing data to sector $s_{34}$ in track $trk_{17}$, only sector 34 in tracks $trk_{17}$ to $trk_{99}$ are saved into a cache and rewritten, rather than all the sectors in tracks $trk_{17}$ to $trk_{99}$. In other implementations, a method includes determining the data sector(s) to be rewritten or modified in a band, determining the corresponding sector(s) in downstream or down-track tracks, and rewriting only a part of those down-track tracks, rather than the entire track; again, the method entails rewriting only sector(s) of the band, rather than the entire band, thus saving writing time and power.

FIG. 1 illustrates an example implementation of a data storage device 100. Although other implementations are contemplated, in the illustrated implementation, data storage device 100 includes a storage medium 102 (e.g., a magnetic data storage disc) having a surface 104 on which data bits can be recorded using a magnetic write pole and from which data bits can be read using a sensor, e.g., a magnetoresistive (MR) element. The storage medium 102 rotates about a spindle center or a disc axis of rotation 105 during rotation, and includes an inner diameter 106 and an outer diameter 108 between which are a number of concentric data tracks 110. It should be understood that the technology described herein can be used with a variety of storage formats, including continuous magnetic media, discrete track (DT) media, shingled media (SMR), etc.

Information may be written to and read from data bit locations in the data tracks 110 on the storage medium 102. An actuator assembly 120, having an actuator axis of rotation 122, supports a transducer head assembly 124 at a distal end thereof. The transducer head assembly 124 'flies' in close proximity above the surface 104 of the storage medium 102 during disc rotation. The actuator assembly 120 rotates during a seek operation about the actuator axis of rotation 122, the seek operation being controlled by a controller (not shown). The seek operation positions the transducer head assembly 124 over a target data track for read and write operations.

A portion of the tracks 110 is shown enlarged in the inset. In the particular implementation illustrated, tracks 110 are arranged in bands 112 (e.g., groups of logical sectors) with an isolation region or guard track 114 between adjacent bands 112. In some implementations, each band 112 has 10 to 100 tracks, although bands in other implementations have less or more tracks per band. Each track 110 includes numerous sectors 116 for storage data therein. The tracks 110 may also include a media cache, media scratch pad, etc., which are not shown in this figure.

During use of system 100, the controller sends a write command to the transducer 124 to write data to a sector 116 on a track 110. With shingled media recording (SMR), the writing to a given track 110 affects at least one adjacent track, thus requiring multiple downstream tracks 110 to be rewritten. With the system of this disclosure, rather than writing to the entire adjacent track 110, only the downstream sectors 116 are rewritten.

Figure 2:
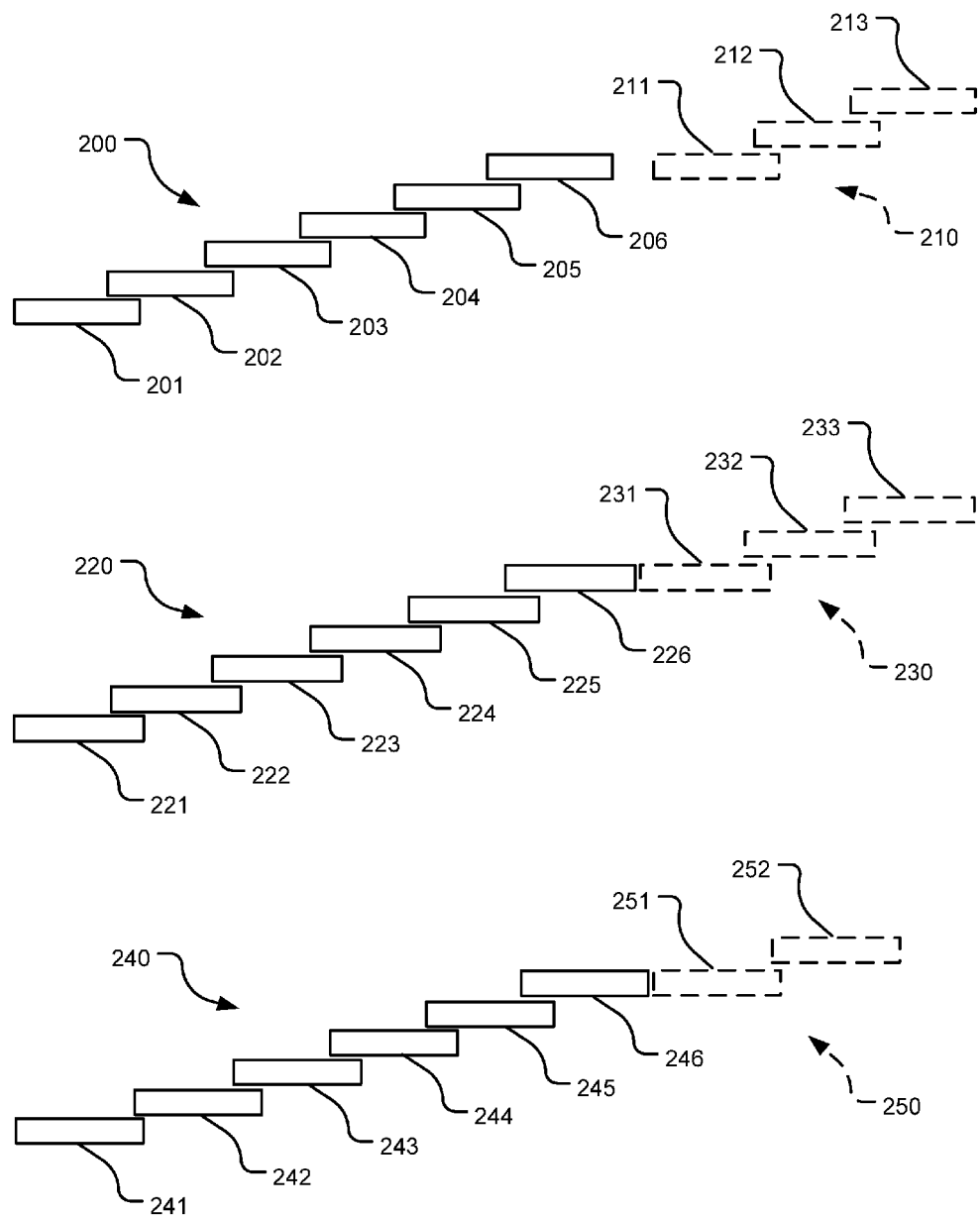
FIG. 2 is a schematic side view of example data bands having a plurality of shingled media tracks.

FIG. 2 shows a side or end view of several examples of shingled media data bands.

In the first implementation, band 200 has tracks 201, 202, 203, 204, 205 and 206, to illustrate the overlapping of adjacent tracks in a SMR track (note, that in actuality, the tracks are not positioned vertically on separate planes; this is shown for illustration purpose only in this figure). In this implementation, the tracks 201, 202, 203, 204, 205 and 206 can be referred to as "slim tracks" and the track 206 can be referred to as a "fat track," because this track is not overlapped by another track. The next adjacent downstream track is illustrated in phantom as band 210, with only tracks 211, 212 and 213 illustrated, although it is understood that the band 210 could have additional tracks. A physical gap exists between the band 200 and the band 210 (particularly, between the track 206 and the track 211); this gap would be an area on the storage media (e.g., the disc) void of any tracks. The tracks 202 through 206 overlap the previous upstream track, specifically the tracks 201 through 205, respectively. Thus, for example, part of the track 202 overlaps part of the track 201, a part of the track 203 overlaps part of the track 202, etc. As a result, if data is to be written to an intermediate track, such as for example, the track 204, the data on that track 204 and each of the down-track tracks 205 and 206 is affected. Data in the down-track band 210 is not affected.

Another implementation is illustrated with band 220 and adjacent band 230. The band 220 has overlapping slim tracks 221, 222, 223, 224, 225 and fat track 226. The adjacent downstream band 230 has tracks 231, 232 and 233 illustrated, although it is understood that the band 230 could have additional tracks. Essentially no gap exists between the band 220 and the band 230.

Another implementation is illustrated with band 240 and adjacent band 250. The band 240 has overlapping slim tracks 241, 242, 243, 244, 245 and fat track 246. The adjacent downstream band 250 has tracks 251 and 252 illustrated, although it is understood that the band 250 could have additional tracks. In some implementations, the overlap between the first track 241 and the second track 242 (and track 251 and track 252) is different than the overlap between other tracks, such as track 242 and track 243; in this particular implementation, the overlap between tracks 241 and 242 is less than the overlap between tracks 242 and 243. Essentially no gap exists between the band 240 and the band 250.

Figure 3:
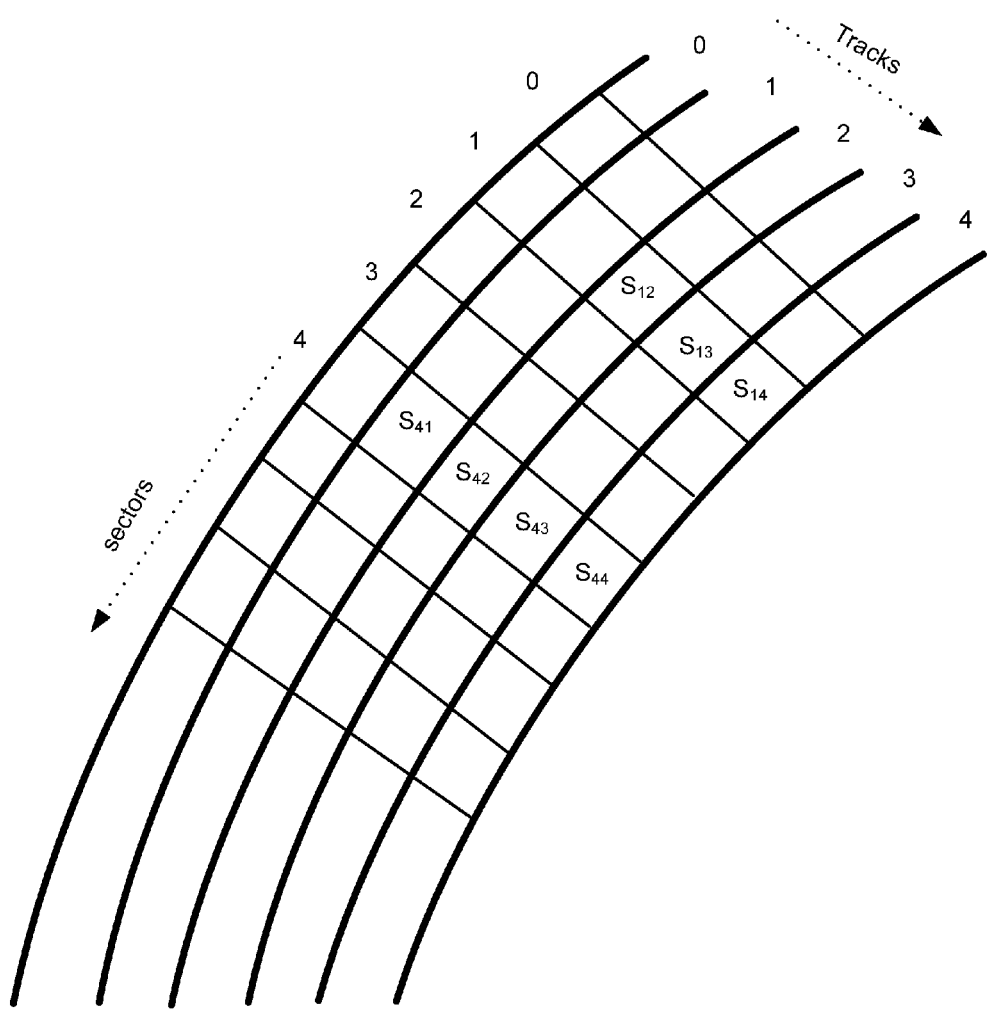
FIG. 3 is a top schematic rendition of an example portion of a data band having a plurality of tracks, each track having a plurality of sectors.

FIG. 3 shows, in a simplified manner, a band layout. As indicated above, each band has a plurality of tracks, with each track having a plurality of sectors. In FIG. 3, five tracks are shown, tracks 0, 1, 2, 3 and 4. Each track includes sectors 0, 1, 2, 3, 4, etc. Each sector can be identified with its track number and its sector number. For example, the second sector (i.e., sector 1) in the third track (i.e., track 2), is identified as $S_{12}$. Other sectors are identified in a likewise manner. Sector $S_{12}$ has down-track sectors $S_{13}$ and $S_{14}$. As another example, sector $S_{41}$ has down-track sectors $S_{42}$, $S_{43}$ and $S_{44}$. Such sector identification is used for both shingled and non-shingled media. Methods in accordance with this disclosure include identifying the data sector(s) to be rewritten or modified in a band, determining the corresponding down-track sector(s), and rewriting only those down-track sectors rather than the entire downstream or down-track band. Thus, writing to the sector $S_{12}$ involves reading data from the sectors $S_{13}$ and $S_{14}$ and writing to the sectors $S_{12}$, $S_{13}$ and $S_{14}$.

Figure 4:
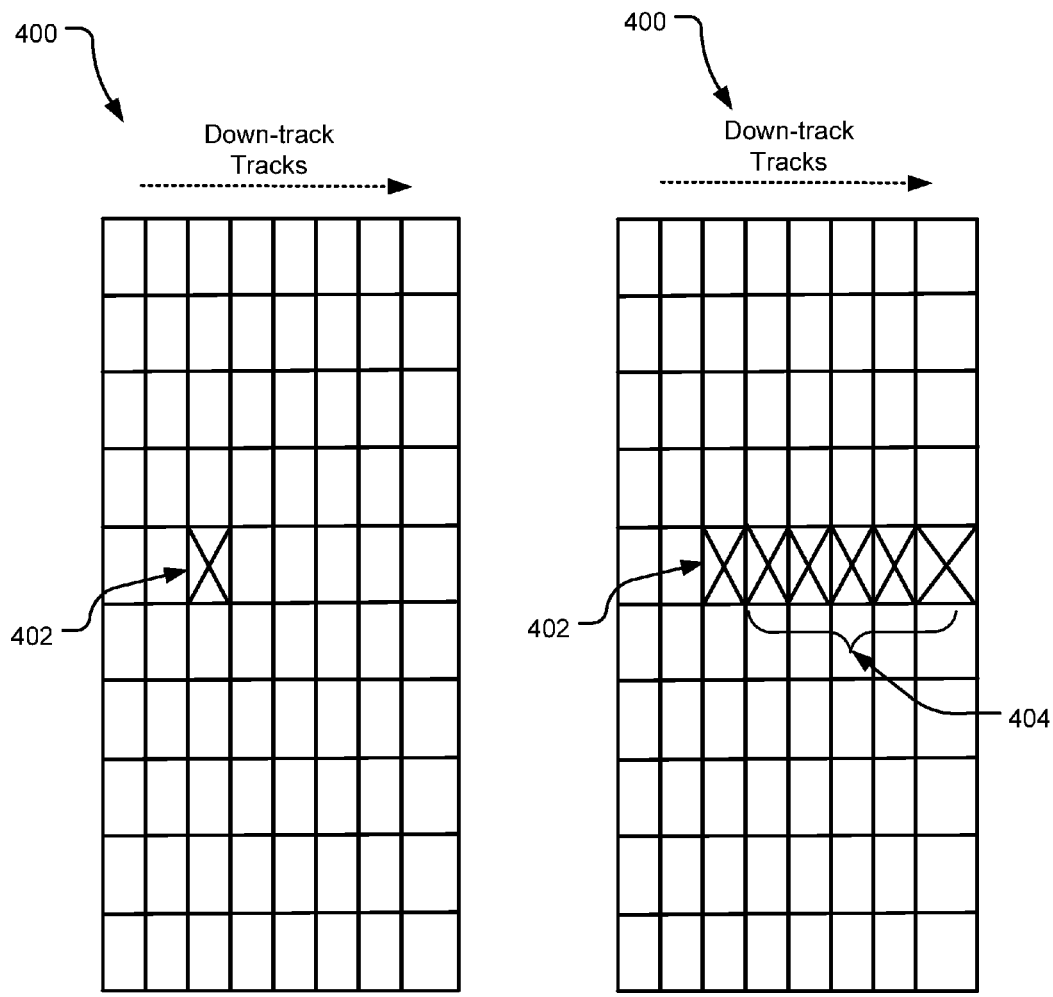
FIG. 4 is a top schematic rendition of an example portion of a data band showing one example target sector and its corresponding downstream sectors.

FIG. 4 illustrates an example implementation where a sector 402 in a band 400 is identified as the target sector to be rewritten or modified. FIG. 4 also illustrates the corresponding down-track sectors 404 of sector 402. Thus, when data in the sector 402 is to be written or modified, all the data from the sector 402 and the corresponding down-track sectors 404 is written to a media cache. After the data from the sector 402 is modified as appropriate, the modified data is written to the sector 402 and the original data from the sectors 404 is rewritten back to the sectors 404, unmodified.

Figure 5:
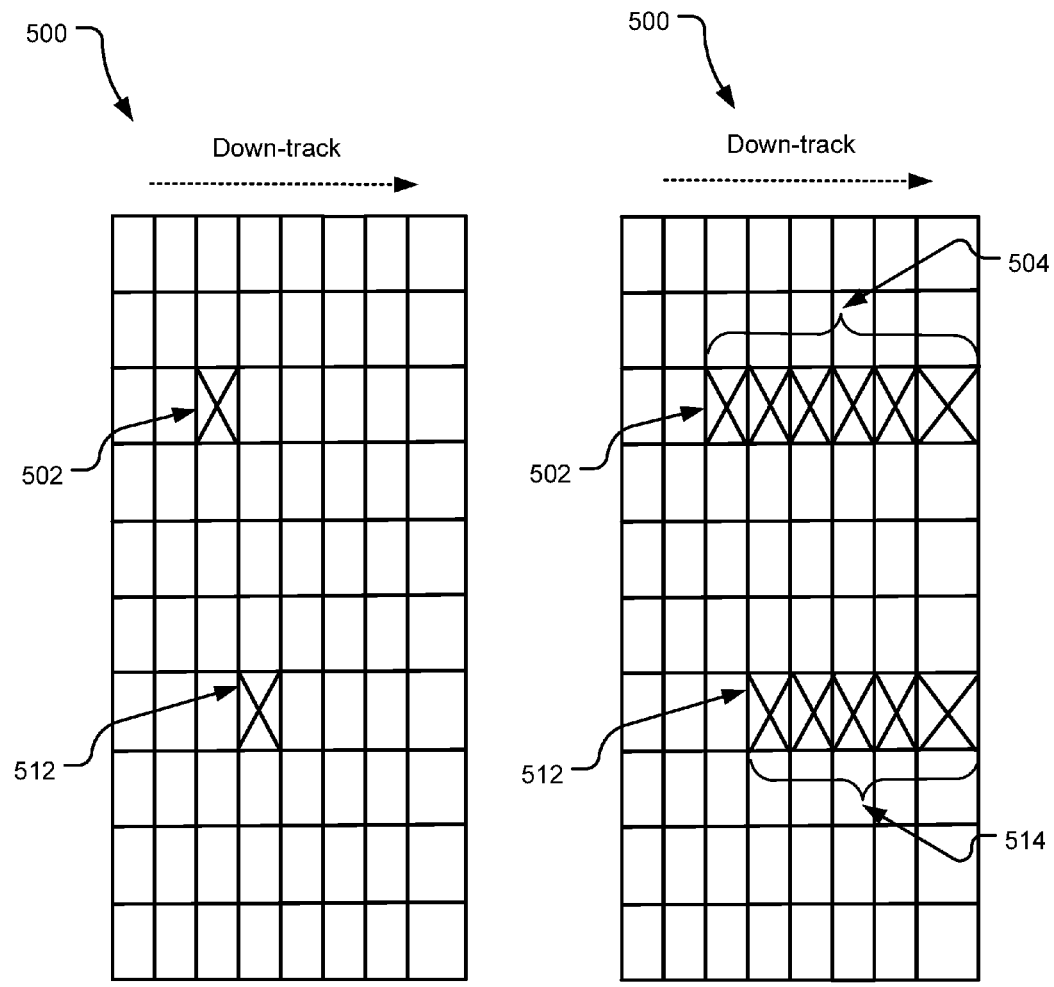
FIG. 5 is a top schematic rendition of an example portion of a data band showing two example target sectors and their corresponding downstream sectors.

FIG. 5 illustrates an example implementation where two sectors in a band 500, particularly sector 502 and sector 512 are identified as target sectors to be rewritten or modified. FIG. 5 also illustrates the corresponding down-track sectors 504 of sector 502 and sectors 514 of sector 512. Similar to as described in respect to FIG. 4, when data in the sectors 502 and 512 is to be written or modified, all the data from the sectors 502 and 512 and the corresponding down-track sectors 504 and 514 is written to a media cache. After the data from the sectors 502 and 512 is modified as appropriate, the modified data is written back to the sectors 502 and 512, and the original data from the down-track sectors 504 and 514 is rewritten back to the sectors 504 and 514, unmodified.

Even though FIG. 4 illustrates one target sector 402 and FIG. 5 illustrates two target sectors 502 and 512, it is to be understood that a write operation may be directed to more than two target sectors, e.g., three target sectors, four target sectors, etc.

Figure 6:
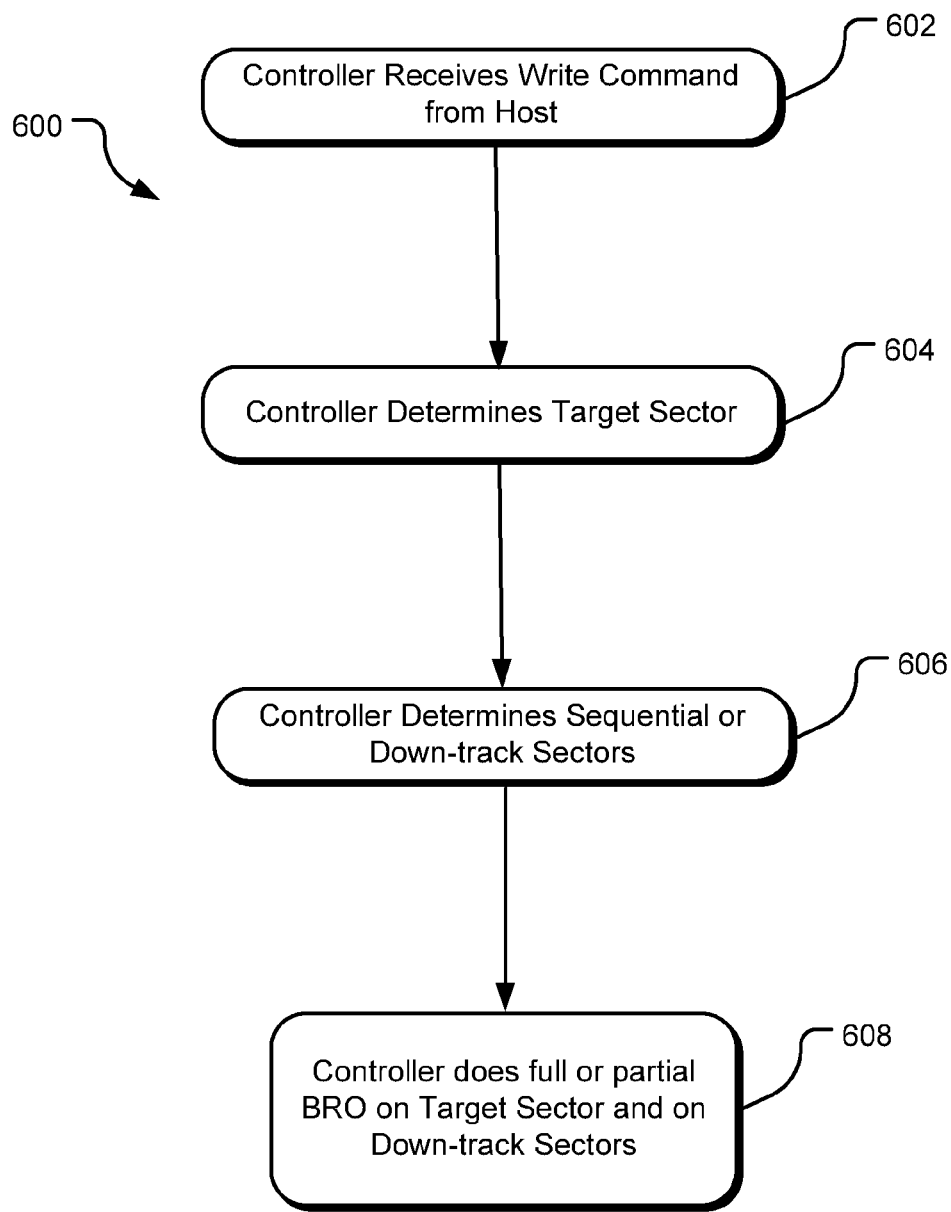
FIG. 6 is a flow chart of an example method of sector-based writing.

FIG. 6 provides an example sector-based writing method 600. In a first operation block 602, the controller receives a write command from the host; in other operations, the controller initiates a modify command internally. The controller determines, in operation block 604, the target sector for which the data is to be written or modified. In operation block 606, the controller determines the down-track sectors from the target sector. In operation block 608, the controller initiates a band rewrite operation (BRO) on the target sector and on the down-track sectors; in this operation, only the down-track sectors are read, saved, and rewritten. Whether the BRO is a full BRO or a partial BRO depends on the target sector. If the target sector is in the first track, then the corresponding sector in all tracks in the band are rewritten (i.e., a full BRO), whereas if the target sector is the second or other down-track track, only the corresponding sectors in the down-track tracks are rewritten (i.e., a partial BRO).

In another example process of sector-based writing, when a device receives a write command from the host to write new data to the disc, or when the device internally initiates a modify command to modify some existing data on the disc, the device responds to the write and/or modify command(s) by reading and copying all of the data in the sector where the new material is to be written to a non-volatile cache or to a media scratch pad. After the sector data is copied to the cache or media scratch pad, the data is modified in the cache or media scratch pad with the new data; the modified data is read back from the cache or media scratch pad and re-written to the sector, thus incorporating the new data associated with the write and/or the modify command. Additionally, the device responds to the write and/or modify command(s) by reading and copying all of the data in the sector down-track of the sector where the new material is to be written; this down-track sector data is also copied to the media scratch pad. When the modified target sector data re-written to the target sector, the data from the down-track sectors is also rewritten (unmodified) back to the appropriate down-track sector.

Figure 7:
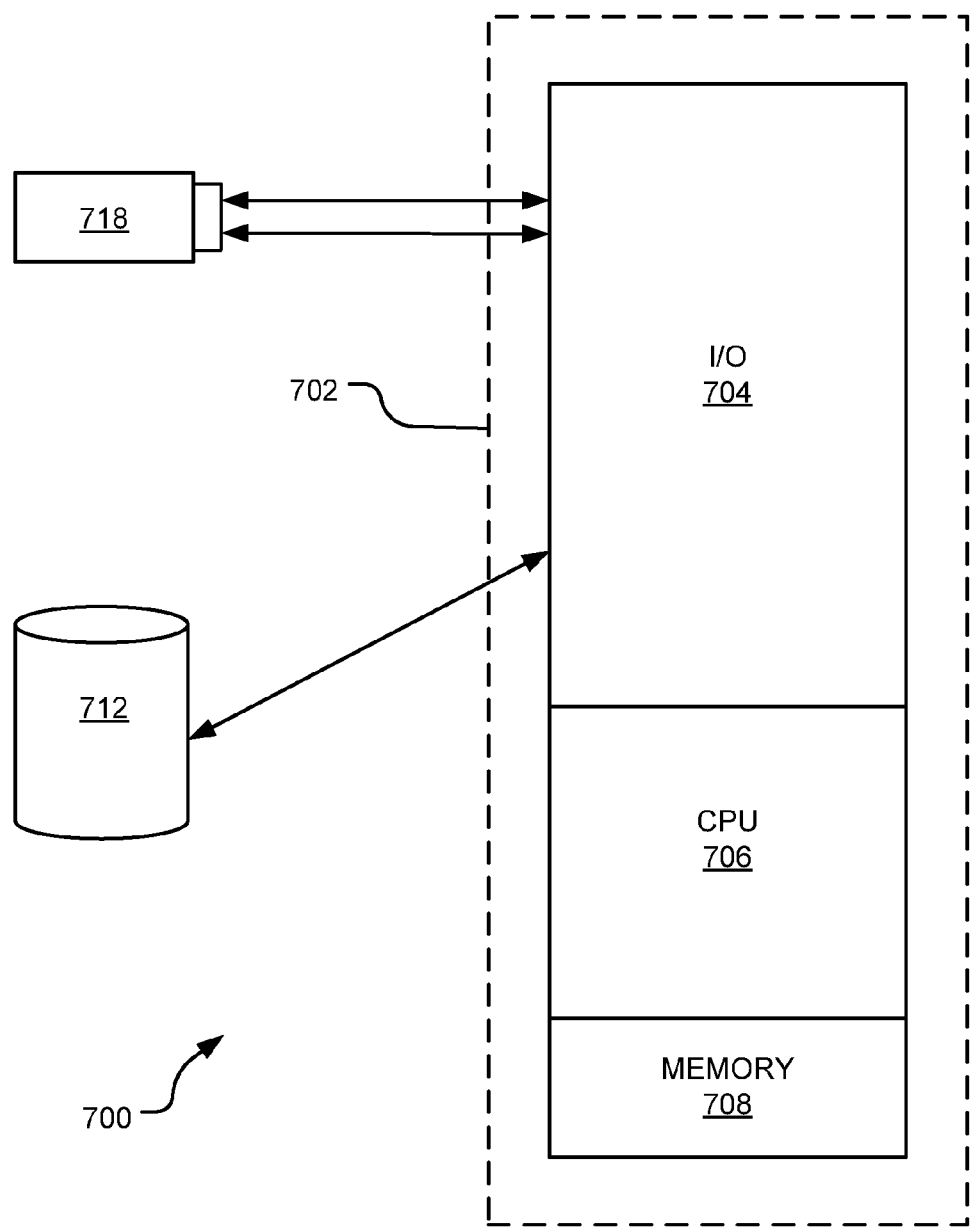
FIG. 7 is a block diagram of an example computer system suitable for implementing the sector-based write operation.

FIG. 7 discloses a block diagram of a computer system 700 suitable for implementing the sector-based writing process of this disclosure on a magnetic media disc.

The computer system 700 is capable of executing a computer program product embodied in a tangible computer-readable storage medium to execute a computer process. The tangible computer-readable storage medium is not embodied in a carrier-wave or other signal. Data and program files may be input to the computer system 700, which reads the files and executes the programs therein using one or more processors. Some of the elements of a computer system are shown in FIG. 7, where a processor 702 is shown having an input/output (I/O) section 704, a Central Processing Unit (CPU) 706, and a memory section 708. There may be one or more processors 702, such that the processor 702 of the system 700 has a single central-processing unit 706 or a plurality of the processing units 706. The system 700 further includes a controller, not shown in FIG. 7, configured to designate a target sector and determine its down-track sectors; the controller may be software, firmware, or a combination thereof. The system 700 may be a conventional computer, a distributed computer, or any other type of computer. The described technology is optionally implemented in software loaded in the memory section 708, a disc storage unit 712, or a removable memory 718.

In an example implementation, the selection of the target sector may be embodied by instructions stored in the memory 708 and/or the storage unit 712 and executed by the processor 706. Further, local computing system, remote data sources and/or services, and other associated logic represent firmware, hardware, and/or software which may be configured to adaptively distribute workload tasks to improve system performance. The technology may be implemented using a general purpose computer and specialized software (such as a server executing service software), a special purpose computing system and specialized software (such as a mobile device or network appliance executing service software), or other computing configurations. In addition, program data, such as dynamic allocation threshold requirements and other information may be stored in the memory 708 and/or the storage unit 712 and executed by the processor 702.

The implementations described herein may be implemented as logical steps in one or more computer systems. The logical operations of the various implementations described herein are implemented (1) as a sequence of processor-implemented steps executing in one or more computer systems and (2) as interconnected machine or circuit modules within one or more computer systems. The implementation is a matter of choice, dependent on the performance requirements of the computer system. Accordingly, the logical operations making up the implementations of the implementations described herein are referred to variously as operations, steps, objects, or modules. Furthermore, it should be understood that logical operations may be performed in any order, unless explicitly claimed otherwise or a specific order is inherently necessitated by the claim language.

In the interest of clarity, not all of the routine functions of the implementations described herein are shown and described. It will be appreciated that in the development of any such actual implementation, numerous implementation-specific decisions are made in order to achieve the developer's specific goals, such as compliance with application- and business-related constraints, and that those specific goals will vary from one implementation to another and from one developer to another.

The above specification and examples provide a complete description of the structure and use of exemplary embodiments of the invention. The above description provides specific embodiments. It is to be understood that other embodiments are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   determining a target sector of a write operation in response to a request for the write operation to a band in a shingled media storage device;
   determining a plurality down-track data sectors in the band; and
   performing a band rewrite operation on the target data sector and the down-track data sectors.

2. The method of claim 1, wherein determining a plurality down-track data sectors in the band comprises determining a plurality of down-track data sectors as the data sectors affected by a write operation on the target data sector.

3. The method of claim 1, further comprising:
   determining a second target sector of the write operation;
   determining a second plurality down-track data sectors in the band; and
   performing a band rewrite operation on the second target data sector and the second down-track data sectors.

4. The method of claim 3, further comprising:
   determining a third target sector of the write operation;
   determining a third plurality down-track data sectors in the band; and
   performing a band rewrite operation on the third target data sector and the third down-track data sectors.

5. The method of claim 1, wherein performing a band rewrite comprises performing a full band rewrite.

6. The method of claim 1, wherein performing a band rewrite comprises performing a partial band rewrite.

7. The method of claim 1, the band comprising at least 10 tracks.

8. The method of claim 7, the band comprising 100 tracks.

9. A method comprising:
   determining a target sector having initial data and a plurality of down-track data sectors corresponding to the target sector, wherein the target sector and the plurality of down-track sectors are shingled in the down-track direction; and
   rewriting the target sector with modified data and rewriting the plurality of down-track data sectors without rewriting additional sectors not down-track of the target sector.

10. A storage device comprising:
    a storage media configured to store data using shingled media recording (SMR);
    a processor configured to determine a target sector in a band of a write operation and to identify down-track sectors of the target sector in the band; and
    a transducer configured to read and write data to the target sector and to the down-track sectors in the band.

11. The storage device of claim 10, wherein the storage media is configured to store data on a plurality of bands, each band comprising a plurality of tracks.

12. The storage device of claim 10, wherein the processor is further configured to determine a second target sector of the write operation and to identify second down-track sectors of the second target sector.

13. The storage device of claim 10, wherein the storage media is a magnetic disc.

14. The storage device of claim 10, the band comprising at least 10 tracks.

15. The storage device of claim 14, the band comprising 100 tracks.

* * * * *